United States Patent
Ferguson et al.

[19]

[11] Patent Number: 5,817,180
[45] Date of Patent: Oct. 6, 1998

[54] DRY THINNED STARCHES PROCESS FOR PRODUCING DRY THINNED STARCHES AND PRODUCTS AND COMPOSITIONS THEREOF

[75] Inventors: Cameron E. Ferguson; Lawrence S. Ferro; Robert Mooth; Michael D. Harrison, all of Decatur, Ill.

[73] Assignee: A. E. Staley Manufacturing, Decatur, Ill.

[21] Appl. No.: 997,073

[22] Filed: Dec. 23, 1997

Related U.S. Application Data

[62] Division of Ser. No. 543,109, Oct. 13, 1995, Pat. No. 5,766,366.

[51] Int. Cl.$^6$ .................. C09D 103/02; D21H 19/54
[52] U.S. Cl. .................. 127/32; 127/38; 162/175
[58] Field of Search .................. 127/32, 38; 162/175

[56] References Cited

U.S. PATENT DOCUMENTS

| | | | |
|---|---|---|---|
| 248,904 | 11/1881 | Wilson et al. | 127/29 |
| 536,260 | 3/1895 | Bloede . | |
| 773,469 | 10/1904 | Browning et al. | 127/33 |
| 1,139,621 | 5/1915 | Wulkan | 127/1 |
| 1,320,719 | 11/1919 | Stutzke | 127/3 |
| 1,425,497 | 8/1922 | Merrill | 127/1 |
| 1,428,604 | 9/1922 | Merill | 127/1 |
| 1,505,696 | 8/1924 | Brindle | 127/38 |
| 1,516,512 | 11/1924 | Stutzke | 127/32 |
| 1,564,979 | 12/1925 | Singer | 127/38 |
| 1,689,379 | 10/1928 | Darrah . | |
| 1,792,088 | 2/1931 | Haake et al. . | |
| 1,851,749 | 3/1932 | Bergquist . | |
| 1,894,570 | 1/1933 | Phillips | 127/38 |
| 1,937,752 | 12/1933 | Fuller | 127/39 |
| 1,942,544 | 1/1934 | Fuller | 127/38 |
| 2,005,537 | 6/1935 | Dryer et al. | 127/28 |
| 2,108,862 | 2/1938 | Kerr | 127/33 |
| 2,127,205 | 8/1938 | Hempstead et al. | 127/38 |
| 2,274,789 | 3/1942 | Horesi | 127/38 |
| 2,332,345 | 10/1943 | Rowe et al. | 127/1 |
| 2,337,688 | 12/1943 | Sipyaguin et al. | 127/1 |
| 2,359,378 | 10/1944 | Morris | 127/38 |
| 2,359,763 | 10/1944 | Horesi | 127/38 |
| 2,374,676 | 5/1945 | Gardner | 127/38 |
| 2,516,634 | 7/1950 | Kesler et al. | 260/209 |

(List continued on next page.)

FOREIGN PATENT DOCUMENTS

| | | |
|---|---|---|
| 2376161 | 7/1978 | France . |
| 2318035 | 10/1974 | Germany ............ C13L 1/10 |
| 3014951 | 10/1981 | Germany ............ C13L 1/10 |
| 99013 | 1/1925 | Switzerland . |
| 256502 | 8/1948 | Switzerland . |
| 383778 | 11/1932 | United Kingdom . |
| 429833 | 5/1935 | United Kingdom . |
| 544245 | 4/1942 | United Kingdom . |

OTHER PUBLICATIONS

Buttrose, M.S. Electron–Microscopy of Acid–Degraded Starch Granules, *Die Starke*, No. 3 (1963) p. 85 no month avail.

Evans, R. B., et al. Study of the Thixotropy of Carnary Corn Dextrins, *Die Starke*, No. 12 (1963) p. 448 no month avail.

*Starch and Starch Products in Paper Coating*, TAPPI Monograph Series—No. 17, Technical Association of the Pulp and Paper Industry (1957) no month avail.

(List continued on next page.)

*Primary Examiner*—David Brunsman
*Attorney, Agent, or Firm*—Arnold White & Durkee

[57] ABSTRACT

A novel dry thinned starch produced by continuously feeding a mixture of a base starch and a chemical which hydrolyses the glycosidic linkage of starch to a plug flow reactor, passing the mixture through the reactor, recovering the mixture and neutralizing the mixture. The present invention also includes starches produced by the process and paper products produced from the starch and coated with the starch.

23 Claims, 1 Drawing Sheet

U.S. PATENT DOCUMENTS

| | | | |
|---|---|---|---|
| 2,698,818 | 1/1955 | Staerkle | 127/38 |
| 2,698,937 | 1/1955 | Staerkle | 260/233.3 |
| 2,818,357 | 12/1957 | Ziegler et al. | 127/36 |
| 2,845,368 | 7/1958 | Fredrickson | 127/38 |
| 3,003,894 | 10/1961 | Fredrickson | 127/71 |
| 3,137,592 | 6/1964 | Protzman et al. | 127/71 |
| 3,137,952 | 6/1964 | Protzman et al. | 127/32 |
| 3,175,928 | 3/1965 | Lancester et al. | 127/32 |
| 3,284,443 | 11/1966 | Hay et al. | 260/233.5 |
| 3,351,489 | 11/1967 | Battista et al. | 127/32 |
| 3,479,220 | 11/1969 | Ferrara | 127/32 |
| 3,528,853 | 9/1970 | Pelton | 127/32 |
| 3,884,853 | 5/1975 | Zimmerman | 260/17.3 |
| 3,967,975 | 7/1976 | Idaszak | 127/23 |
| 4,021,927 | 5/1977 | Idaszak | 34/10 |
| 4,137,094 | 1/1979 | Hughes | 127/32 |
| 4,192,900 | 3/1980 | Cheng | 127/32 |
| 4,239,592 | 12/1980 | Gaspar et al. | 162/175 |
| 4,761,185 | 8/1988 | Chornet et al. | 127/38 |
| 4,787,939 | 11/1988 | Barker et al. | 127/32 |
| 5,192,576 | 3/1993 | Chang et al. | 127/32 |
| 5,275,774 | 1/1994 | Bahr et al. | 127/32 |

OTHER PUBLICATIONS

*Starch for Paper Coating*, TAPPI Monograph Series—No. 3, Technical Association of the Pulp and Paper Industry (1947) no month avail.

*Industrial Gums—Polysaccharides and Their Derivatives*, Second Edition, Academic Press, New York and London (1973) no month avail.

*Starch: Chemistry and Technology*, vol. I, Academic Press, New York and London (1965) no month avail.

Caesar, G. V., et al., Classification of Starch Derivatives—Significance of the Barium Hydroxide Method, *Industrial and Engineering Chemistry*, vol. 31, No. 7, p. 921 no month avail.

Kerr, Ralph W., et al., Chemistry of Dextrinization, *Die Starke*, No. 10 (Oct. 1953) p. 261.

Yang, Chien–Tse, et al., Studies on Manufacture of Pyrodextrins from Rice, *Journal of the Chinese Agricultural Chemical Society*, vol. 26, No. 1 (Mar. 1988) pp. 63–68.

Acton, W., The Manufacture of Dextrins and British Gums, *Starch Production Technology*, Applied Science Publishers Ltd.–London (1976) chapter 15 no month avail.

Smith, Lee T., et al., Dextrinization of Potato Starch with Gaseous Hydrogen Chloride, *Industrial and Engineering Chemistry*, (Nov., 1944) p. 1052.

Caesar, G.V., Dextrins and Dextrinization, *Starch and its Derivatives*, Fourth Edition, Chapter Nine p. 282 (Chapman and Hall Ltd.–London) no date avail.

Chemical Modification and Degradation, *Starch Conversion Technology*, p. 85 (edited by G.M.A. Van Beynum and J.A. Roels) no date avail.

Pyroconversions, *Modified Starches: Properties and Uses*, (edited by O.B. Wurzburg, M.S. for CRC Press, Inc–Boca Raton, Florida) pp. 29–40 no date avail.

Manufacture for Dextrins, *Chemistry and Industry of Starch*, (edited by Ralph W. Kerr, Ph.D. for Academic Press Inc.–new York (1950) pp. 357–373 no month avail.

Production and Use of Starch Dextrins, *Starch: Chemistry and Technology*, vol. II, chapter 11 (edited by Roy L. Whistler and Eugene F. Paschall for Academic Press–New York and London 1967) no month avail.

Knight, J.W., Conversion Products of Starch, *The Starch Industry*, pp. 94–103 (Pergamon Press–London) no date avail.

*Starch and Starch Products in Paper Coating*, (edited by Robert L. Kearney and Hans W. Maurer for TAPPI Press) no date avail.

*HI–FI™ 7381 Starch*, Staley Industrial Products no date avail.

When Every Run Must Be Dry,. *Manufacturing Chemist*, vol. 59, No. 2 (1988) p. 28 no month avail.

*Pulp And Paper Manufacture–Third Edition*, vol. 8 Coating, Converting, and Specialty Processes, (McGraw–Hill 1990) pp. 44–49)no month avail.

Shildneck, Paul and C.E. Smith, Production and uses of Acid–Midofied Starch, *Starch: Chemistry and Technology*, vol. II, Chapter 9 (edited by Roy L Whistler and Eugene F. Paschall for Academic Press–New Yrok and London 1967) p. 217 no month avail.

Rohwer, Robert G. and Robert E. Klem, Acid–Modified Starch: Prodcution and Uses, *Starch: Chemistry and Technology*, Second Edition, Chapter 17 (edited by Roy L. Whistler, James N. Bemiller and Eugene F. Paschall for Academic Press–New York 1984) p. 529 no month avail.

ABSTRACT: U.S.S.R. Patent No. SU 1,789,526 A 1, issued (Jan. 23, 1993) entitled *Chamber Apparatus for Dextrinization of Starch*, invented by Nikolaj G. Galyuk, and Aleksandr A. Dudukalov No date avail.

ABSTRACT: German Patent No. 2,318,035, issued in (1974) entitled *Method and Device for Producing Dextrin From Starch of Starch Containing Products in a Fluidized Bed*, invented by R. Schirner, H. Fischer, G. Freyer, J. Jieder, T. Bernhardt, G. Bernhardt and H. Rothfuss No month avail.

*The Merck Index–11th Edition*, Merck & Co. (New Jersey) (edited by Susan Budavari) (1989) p. 2832 no month avail.

ABSTRACT: British Patent No. 215,705, issued (May 9, 1923), entitled *Liquefying and Saccharifying Starch,.*

Gorner, Von A., Ein Neues Kontinuierliches Dextrinierungscerfahren, *Die Starke* No. 12 (1960) p. 365 no month avail.

Powell, Eugene L., Starch Amylopectin (Waxy Corn and Waxy Sorghum), *Industrial Gums*, Second Edition, Chapter XXV (edited by Roy L. Whistler and James N. Bemiller for Academic Press–New York and London 1973) p. 567 no month avail.

Satterthwaite, Robert W. and Donald J. Iwinski, Starch Dextrins, *Industrial Gums*, Second Edition, Chapter XXV (edited by Roy L. Whistler and James N. Bemiller for Academic Press–New York and London (1973) p. 577 no month avail.

Mentzer, Merle J., Starch In The Paper Industry, *Starch: Chemistry and Technology*, Second Edition, Chapter XVIII (edited by Roy L. Whistler, James N. Bemiller and Eugene F. Paschall for Academic Press–New York (1984) p. 543 no month avail.

Jenike & Johanson, *Mass Flow Purge and Conditioning Vessels* no date avail.

Rosin Thermal Process Engineers—Experts in Industrial Drying, Cooling & Heating no date avail.

Dumbaugh, George D., Kinergy Corporation Induced Vertical Flow, *Feed Management*, vol. 34, No. 11, (Nov. 1983).

Johanson, Dr. Jerry R., Solids Segregation: Causes and Solutions, *Powder and Bulk Engineering*, (Aug 1988) p. 13.

Johanson, Jerry R., Know Your Material—How to Predict and Use the Properties of Bulk Solids, *Chemical Engineering*, Deskbook Issue, pp. 9–17 (Oct. 20, 1978), Copyright McGraw–Hill, Inc., 1978.

Belingheri, Michael and Dr. Jerry R. Johanson, *Johanson Indicizer™ System*, (Apr. 8, 1991).

PCT International Search Report (PCT/US96/16285) (Jan. 24, 1997).

Thomson, T.R., et al. *Heterogeneous Reaction of Granular Starch With Hydrogen Chloride*, Cereal Chemistry, vol. 44, No. 2 (Mar. 1967) pp. 105–117.

DRY THINNED STARCHES PROCESS FOR PRODUCING DRY THINNED STARCHES AND PRODUCTS AND COMPOSITIONS THEREOF

This is a divisional of application Ser. No. 08/543,109 filed Oct. 13, 1995 now U.S. Pat. No. 5,766,366.

BACKGROUND OF THE INVENTION

This invention relates to novel dry thinned starches, continuous processes for producing dry thinned starches and to compositions and products thereof. More particularly, the invention relates to dry thinned starches produced in a continuous process under specified interrelated process conditions. It also relates to compositions incorporating such starches such as paper sizing and coating compositions and to paper products produced from such compositions.

SUMMARY OF THE INVENTION

The present invention produces novel dry thinned starch. The dry thinned starches are produced by continuously feeding a mixture of a base starch and a chemical which hydrolyses the glycosidic linkage of starch to a plug flow reactor, passing the mixture through the reactor, recovering the mixture and neutralizing the mixture.

The invention also includes starches produced by the process and paper products produced from the starch.

DETAILED DESCRIPTION

Introduction

Figure 1:
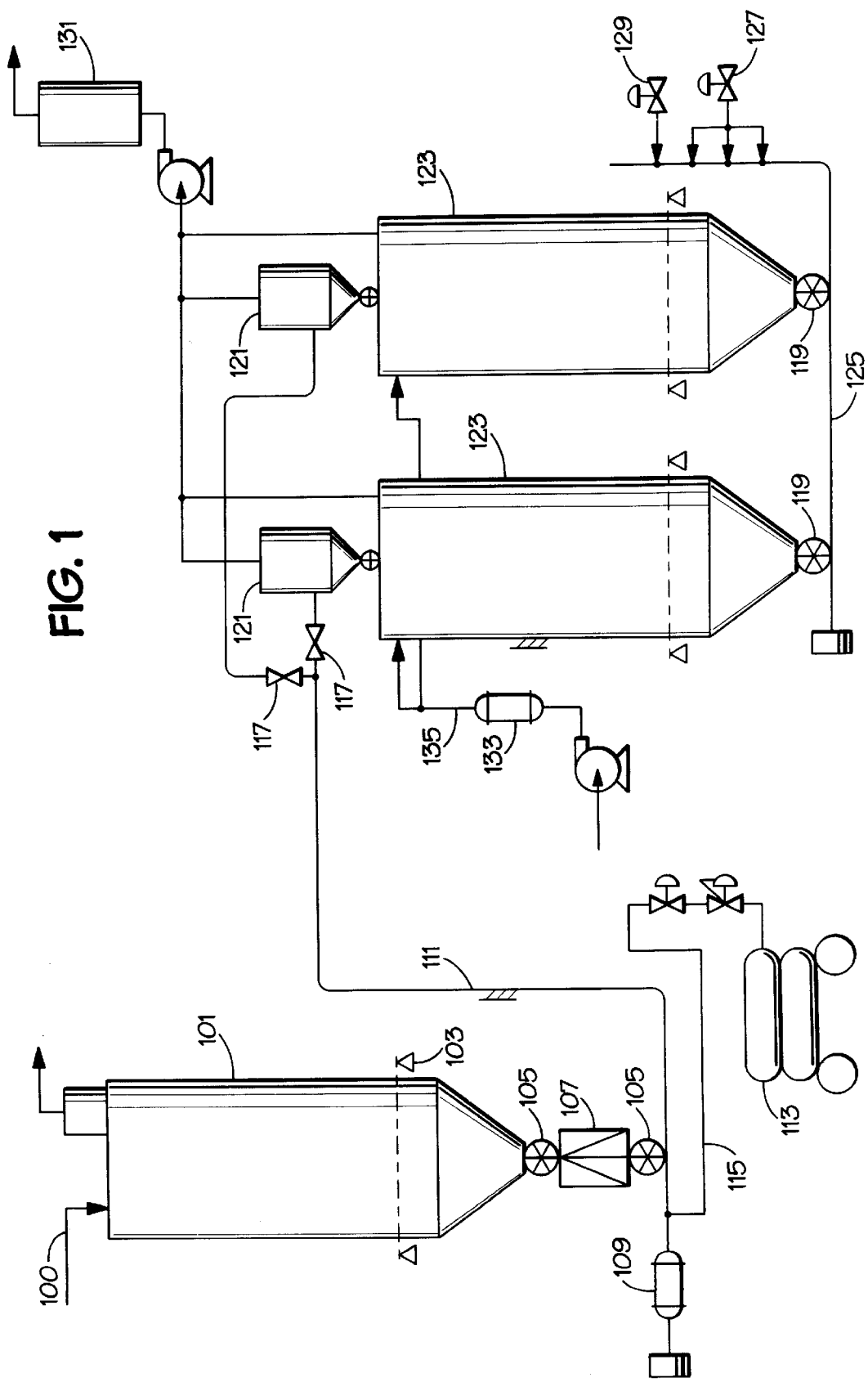
FIG. 1 is a schematic flow diagram of a dry thinning process.

Starches are widely used in paper coating formulations to give the required rheology, water holding, and binding properties. Typically, low viscosity starches are required to achieve high solids in the coating system. High solids are needed to reduce the drying cost and to reduce surface deformation due to excessive shrinkage of the surface layer during drying. Another requirement of such starches is that they exhibit resistance to retrograding, i.e., the formation of insoluble precipitates from the association of poorly soluble linear dextrins present in starch solution and low DE (dextrose equivalent) hydrolyzates.

Hydroxyethylated dent corn starches are presently used in such coatings because they are low cost and their cooked pastes resist retrogradation substantially better than unmodified dent corn starch. Thinned unsubstituted waxy starches have the same or greater resistance to retrogradation than the hydroxyethylated dent starches and are less expensive to produce.

Low viscosity starches are prepared by reducing the molecular weight of the starch polymers. Most common processes use either an acid, an enzyme, or an oxidizing agent for molecular weight reduction. These thinning reactions are typically carried out in an aqueous slurry of the starch. Upon thinning the starches to the preferred viscosity, it becomes necessary to filter the starch from the slurry so that it can be dried and recovered. Some of the soluble starch and salts of neutralization generated by the thinning reaction are substantially lost in the effluent. This results in a significant economic loss due to yield loss, drying inefficiencies and an increased load on the effluent treatment facilities. In the case of hydroxyethylated starch, a portion of the hydroxyethyl substituent is also lost which increases the economic disadvantages of its use.

An alternate route for making starches with the above performance characteristics, but without the economic loss resulting from present processes, has been found. The essential characteristics of this method are the injection of a glycosidic hydrolyzing chemical into starch which is in a non-slurry state, heating at a temperature and for a time necessary to produce a starch with the required-viscosity, and then neutralization. No washing of the final product is required. This process can be used for any type of starch to be thinned.

Dry thinned waxy starch products allow higher solids concentration compositions that give the same viscosity as lower concentration modified starch compositions. In paper manufacture, this is an advantage at the sizepress and coater which are both viscosity constrained. Waxy starch is unique in this feature compared to modified or unmodified dent corn starch.

A process has been developed for the continuous dry reaction of starch. This process is used for reduction of molecular weight (thinning) via chemical hydrolysis of the glycosidic linkages of starch. A preferred means of chemical hydrolysis is by gaseous acidification. A primary use for these starches is in the paper industry. They will be used at the size press and on paper coaters. Their purpose is to add viscosity (flow properties) and water holding to the coating colors and strength to the sheet at the size press.

Any starch source including common dent corn, waxy maize, potato, waxy milo, arrowroot, wheat, rice, tapioca and sago starches can be thinned by this process. The preferred base starches for paper applications are waxy starches (amylopectins) derived from waxy maize due to their resistance to retrogradation. Chemically modified dent starches (at least 20% amylose) also exhibit resistance to retrogradation. Chemical modification contributes resistance to retrogradation via steric hindrance. Linear starch chains are prevented from aligning due to the addition of substituents. Such starches include starches modified with epoxides such as ethylene oxide, propylene oxide and epichlorohydrin. Of these, starches modified with ethylene oxide are preferred in paper applications. The source starch can be chemically modified by other means such as 1) bleaching with hydrogen peroxide, ammonium persulfate, chlorine, chlorite and permanganate; 2) oxidation with chlorine; 3) esterification with acetic anhydride, phosphates, octenyl succinic anhydride, phosphorous oxychloride, succinic anyhydride and vinyl acetate; 4) etherification with acrolein or 5) formation of cationic derivatives with reagents such as 2,3-epoxypropyltrimethylammonium chloride or (4-chlorobutene-2) trimethylammonium chloride prior to the dry thinning process. Such starches are well known in the art and are commercially available. For example, ETHYLEX® gums are available from A. E. Staley Manufacturing Co. of Decatur, Ill., are derivatives of corn starch in which hydroxyethyl groups have been attached to the starch. Although not as resistant to retrogradation, useful starch products can also be prepared by the process of the invention from common dent corn starch. The dry thinned modified starches produced by this process can be used in food and textile applications in addition to the described paper applications. In such cases, the dry thinned modified starches are used to replace modified starches which have been thinned in traditional aqueous slurry processes.

Dry Thinning Process

A dry thinning process has been discovered wherein the molecular weight of base starches is reduced by the reaction of the starch with a glycosidic hydrolyzing chemical in a continuous reactor. Any chemical which hydrolyses the glycosidic linkage of starch in the reaction conditions described can be used. There are three primary groups of hydrolyzing chemicals that can be used. Group I includes acids such as hydrogen chloride gas (gaseous HCl), hydrochloric acid (HCl) and sulfuric acid; Group II includes oxidants such as ammonium persulfate, hydrogen peroxide and chlorine gas; and Group III includes acids such as sulfur dioxide gas, carbon dioxide gas, nitric acid, phosphoric acid, monochloroacetic acid, ammonium chloride (Lewis acid) and calcium chloride (Lewis acid). Group I chemicals are preferred for use in the dry thinning reaction, with the most preferred hydrolysis chemical being gaseous HCl. Pressurized reactors maybe required when sulfur dioxide and carbon dioxide are used as the hydrolyzing chemicals. In some instances it may be beneficial to use two or more hydrolyzing chemicals together in the process.

The following variables are critical to control the thinning rate: temperature, hydrolyzing chemical addition level, moisture level of the incoming starch, and residence time in the reactor. From these variables the final molecular weight of the starch and the amount of dry substances starch required to give 1000 centipoise of viscosity at 35° C. in an RVA viscometer (VscGm DS) can be predicted. Typically this will be from about 1.5 to about 13 grams starch, dry basis (GmDS starch). The RVA viscometer is a computer controlled, electrically heated, water cooled, mixing and cooking device designed to measure viscosity of materials cooked under different time/temperature profiles. The RVA unit utilizes a 28 gram sample compartment. When used to evaluate products made by this invention, it has been found that a 1.5 to 13 gram starch sample should be placed in the sample compartment. Sufficient water is added to the sample compartment to reach 28.0 grams total weight. The RVA is an instrument for measuring starch cooking properties that provides a practical means for identifying the end point of a thinning reaction. The Rapid Visco Analyzer is made in Australia and marketed in the United States by Foss Food Technology of Eden Prairie, Minn. This instrument allows for rapid generation of viscosity profiles. Standard oils with known viscosities are used to calibrate the RVA over a specified temperature range. This calibration is used to convert RVA units to centipoise.

Experimental design response surfaces can be generated which describe the relationship between the dependent variable (viscosity) and the independent variables (temperature, hydrolyzing chemical level, retention time, initial moisture content). Such a relationship can be defined by an equation of the form:

$$Vsc\ Gm\ DS = a + bT + cC + dR - eM$$

wherein a, b, c, d and e are empirically derived constants that will vary with reactor design and configuration and T is temperature, C is chemical concentration (weight %), R is residence time in the reactor and M is the initial moisture content of the starch (loss on drying).

The starch products of the invention are prepared in a continuous reactor exhibiting plug flow. The advantages of plug flow reactors versus reactors wherein mixing occurs is that the variables, most notably retention time, can be held substantially identical for all of the starch being processed whereas in mixed reactors the starch will be subjected to variable processing times.

Plug flow reactors are known in the art. Such reactors, also referred to as mass flow purge and conditioning vessels, and mass flow bins are designed to allow material in the reactor to flow uniformly from the reactor in a first in first out fashion with little or no mixing of the material. It is recognized that it is difficult, if not impossible, to achieve perfect plug flow in mass flow bins with dry flowable products such as starch. For purposes of this invention, it is the intent to approach plug flow of the starch and hydrolyzing chemical in the mass flow bin/reactor. Plug flow is meant to describe a process in which substantially all of the starch flows through the reactor in a first in first out fashion with little or no channeling of the material in the mass flow bin/reactor.

To obtain substantially mass flow in such a vessel, the conical slope of the vessel should be about 65 to about 75 degrees. The vessel should have a height to width ratio of at least 2 to 1.

Attainment of plug flow conditions can be determined by measuring certain molecular weight parameters of the thinned product. Two measurements are made by using gel permeation chromatography (GPC) to determine molecular weight parameters of the finished product. The first value, Mw, is the average molecular weight of the thinned starch product, while the second value, Mn, is the number average molecular weight of the thinned starch product. In an ideal dry thinning process such as a batch process, the width of molecular weight distribution decreases as the thinning reaction proceeds. The width of the molecular weight distribution is defined as the difference between Mw and Mn. Perfect plug flow conditions should mimic batch process results. When results from the plug flow continuous process deviate substantially from the batch results, it would be an indication that channeling or non-plug flow conditions exist in the continuous process. The width of the molecular weight distribution can be expressed as (Mw-Mn)/1000. Plug flow conditions exist in the continuous process of this invention when the width of the molecular weight distribution of the thinned product when expressed as (Mw-Mn)/1000 is within + or −25% of the same value for a batch thinned product of the same viscosity.

The process of the instant invention is carried out on a base starch having a moisture content between about 5 percent and about 20 percent weight basis. Preferably the base starch will have a moisture content of about 5 percent to about 17 percent. The most preferred range is from about 10 percent to about 13 percent.

The base starch should be heated to a temperature of about 70° F. (21° C.) to about 170° F. (77° C.) before entering the reactor, and before chemical addition. Preferably the base starch will be at a temperature of about 100° F. (38° C.) to about 140° F. (60° C.).

Prior to entering into the reactor, the hydrolyzing chemical is injected into the starch as a gas or in a finely dispersed liquid. Group I chemicals are injected in an amount from about 0.04 percent to about 0.5 weight percent basis dry starch. Preferably the Group I hydrolyzing chemical will be present in the starch at a concentration of about 0.1 to about 0.4 weight percent. When Group II and III hydrolyzing chemicals are used as the thinning agents, higher amounts of the chemicals are required to obtain the desired thinning. Group II and III hydrolyzing chemicals will be present in the starch at a concentration of about 0.1 to about 2.0 weight percent.

Injection of the hydrolyzing chemical into the starch base requires special handling to avoid degradation and coloring of the starch and potential process shut downs. When anhydrous HCl comes in contact with the base starch, hydrochloric acid is formed from the reaction of the HCl and moisture in the starch. If sufficient quantities of hydrochloric acid form on the starch blackening can occur.

To prevent these problems, steps must be taken to insure equal dispersion of the hydrolysis chemical on the starch.

This is accomplished by injecting the hydrolyzing chemical into the air stream of the pneumatic conveying line transporting the base starch to the reactor before the starch is added to the line The starch-hydrolyzing chemical mixture is introduced into a reactor vessel adapted to provide a mass flow regime, i.e., the starch-hydrolyzing chemical mixture flows through the reactor in a first in and first out manner and without substantial mixing of the starch. Such a flow regime ensures that substantially all of the starch-hydrolyzing chemical mixture experiences substantially the same residence time in the reactor.

While in the reactor, the starch-hydrolyzing chemical mixture is maintained at a temperature of about 70° F. to about 170° F. Preferably the temperature will be from about 100° F. to about 140° F.

The starch-hydrolyzing chemical mixture will be resident in the reactor for a time of about 0.5 to about 6 hours. Preferably the resident time will be from about 1 to about 4 hours.

Upon exiting the reactor the starch-hydrolyzing chemical mixture is neutralized. For example, when HCl or sulfuric acid is used as the hydrolyzing chemical, the thinned starch can be neutralized with anhydrous ammonia or with aqueous bases. Spraying an aqueous solution of soda ash (sodium carbonate) on the starch is the preferred neutralization technique as it provides better uniformity of neutralization and provides a convenient method to rehydrate the starch to any desired moisture content. The starch will preferably be neutralized to a pH of about 6 to 8 and rehydrated to a moisture content about 10 to about 13 percent.

Description of Typical Dry Thinning Process

The dry thinning process of the invention will be further described in reference to a typical processing scheme such as shown in FIG. 1. The reaction variables used in such a typical process will be as described above.

Dried starch, typically provided directly from a flash dryer as is known in the art is provided through line 100 to a surge bin 101. The use of a vessel such as the surge bin is desired to facilitate the feed of the starch to the mass flow bins in a constant and continuous manner. The content of the starch in the surge bin can be monitored conveniently through standard techniques such as the load cells 103. A constant temperature should be maintained throughout the mass flow bin. It may be necessary to jacket or insulate the bin to maintain the temperature. The starch from the feed bin passes through a valve 105 and through an in-line weight indicator 107 and through another valve 105 into pneumatic feed line 111. Heated air is provided into pneumatic feed line upstream from the starch entry point. Also, upstream from the starch entry point into the pneumatic feed line the hydrolyzing chemical, is fed into the heated air stream from hydrolyzing chemical storage tank 113 through line 115.

The starch hydrolyzing chemical mixture is fed from the pneumatic conveying line 111 to two mass flow bins 123. This feed is controlled by valves 117 and would typically be passed through dust collectors 121 as is known in the art. Heated air is provided to the head space of the mass flow bins from the space air heater 133 through the airline 135. As with the surge bin, the contents of the mass flow bins can be monitored through load cells 103.

The starch hydrolyzing chemical mixture then passes through the mass flow bins under a plug flow regime as described above. The dry thinned starch passes from the mass flow bins and into the pneumatic conveying line 125 wherein aqueous base is added through valve and line 127 to neutralize the starch hydrolyzing chemical mixture and water is added through valve 129 to rehydrate the mixture. From line 119, the dry thinned starch is then moved to conventional storage and packaging facilities. Any hydrolyzing chemical such as HCl present in the air stream and in the head space of the reactors is vented through scrubber 131.

Applications in the Paper Industry

The starch products of the invention can be utilized for the sizing and coating of paper prepared from all types of both cellulosic and combinations of cellulosic with non-cellulosic fibers. In addition, synthetic cellulose fibers of the viscous rayon or regenerated cellulose type can also be used as well as recycled waste papers from various sources.

All types of paper dyes and tints, pigments and fillers may be added to the starch compositions (in the usual manner). Such materials include clay, talc, titanium dioxide, calcium carbonate, calcium sulfate, and diatomaceous earths. Other surface sizing compounds as well as pigments, dyes and lubricants can also be used in conjunction with the size and coating compositions.

Application of non-pigmented starch compositions to paper at the size press is referred to as surface sizing. Application of size can also be made at the calendar stack. Dry thinned starches of this invention can be used in surface sizing applications for uncoated paper products by applying the thinned starch to a paper sheet surface. A continuous film of the starch composition is applied to both sides of the paper. Application of pigmented starch composition is referred to as color coating.

Surface sizing improves surface finish, produces a better printing surface and improves the strength characteristics of the paper as well as other properties. By proper control of viscosity, starch sizes can be deposited primarily on the surface of the sheet or permitted to penetrated more deeply into the sheet to produce products with the desired physical properties.

Paper coating refers to the application of a layer of pigment, adhesive and other supplementary materials to the surface of dry paper or paper board. Prior to coating the paper surface maybe sized with dry thinned starch. The composition, commonly referred to as a coating color, is applied to the paper surface in the form of an aqueous suspension. Typical coating compositions contain pigment as the primary coating material and a starch adhesive to bond the pigment particles to each other and to the paper. The most commonly used pigments are clay, calcium carbonate, titanium dioxide and combinations thereof. Other materials such as calcium sulfoaluminate, zinc sulfide, barium sulfate, calcium sulfate, calcium sulfite and diatomaceous silica pigments are also used. Other additives, such as polymeric latexes may be incorporated. Such coatings may be applied to the paper during the paper making process. Typically, however, coatings are applied as a separate step. In either case, the process differs only in the auxiliary equipment needed to perform the coating operation.

Paper or paper board is coated to produce a surface adequate for printing processes. Coatings provide whiteness, brightness, gloss and opacity to paper along with a smoother more uniform surface. Different printing processes require different sheet properties and surface properties. Formulations of coating compositions for such printing processes are well known.

The starch adhesive component of coating compositions must not only act as a binder for the pigment but also must act as a carrier, impact desirable flow characteristics and leveling, regulate the degree of water retention of the coating composition and produce the desired strength, ink receptivity and ink holdout for optimum printing characteristics. The starch adhesive should be easy to prepare, have a high adhesive strength and have a stable viscosity during storage. Starch products of the instant invention satisfy these requirements.

Examples of two starch base coating formulation are given below:

EXAMPLE 1

Low-Grade Paper Coating 50 parts #1 clay
50 parts delaminated clay
10 parts styrene butadiene latex (SBR)
8 parts dry thinned waxy maize starch
0.5 parts insolubilizer
0.3 parts CMC (carboxy methyl cellulose)
1 part calcium stearate
The coating can be applied to paper to achieve a coat weight of 8 g/m²/side

EXAMPLE 2

Medium Grade Paper Coating 85 parts #2 clay
15 parts calcium carbonate
10 parts SBR latex
6 parts dry thinned waxy maize starch
1 part calcium stearate
0.3 parts alginate
0.5 parts insolubilizer
This coating can be applied to paper to achieve a coat weight of 8 g/m²/side The preceding description of specific embodiments for the present invention is not intended to be a complete list of every embodiment of the invention. Persons who are skilled in this field will recognize that modifications can be made to the specific embodiments described here that would be within the scope of the present invention.

What is claimed:

1. A coated paper product comprising
   a paper sheet and
   a coating comprising
   conventional color coat and sizing components and
   dry thinned starch produced by a process comprising
     continuously feeding a mixture of a base starch and a hydrolyzing chemical to a plug flow reactor, said starch having a moisture content between about 5% and about 17% by weight, said hydrolyzing chemical being injected into said starch in an amount ranging from about 0.04 to about 2.0% by weight dry solids basis;
   maintaining the mixture at a temperature of about 70° F. (21° C.) to about 170° F. (77° C.);
   adjusting the feed to said plug flow reactor so as to maintain a residence time of the mixture in the reactor from about 0.5 to about 6 hours;
   recovering the thinned starch; and
   neutralizing the mixture.
2. The paper product of claim 1 wherein said base starch is a waxy maize starch.
3. The paper product of claim 1 wherein said base starch is dent corn starch.
4. The paper product of claim 3 wherein said base starch is a chemically modified dent corn starch.
5. The paper product of claim 4 wherein said base starch is a hydroxyethylated dent corn starch.
6. A coated paper product comprising
   a paper sheet and
   a coating comprising
   conventional color coat and sizing components and
   dry thinned starch produced by a process comprising
     continuously feeding a mixture of an hydroxyethylated starch and a hydrolyzing chemical to a plug flow reactor, said starch having a moisture content of between about 5% and about 17% by weight, said hydrolyzing chemical being injected into said starch in an amount ranging from about 0.04 to about 2.0% by weight dry solids basis;
   maintaining the mixture at a temperature of about 70° F. (21° C.) to about 170° F. (77° C.);
   adjusting the feed to said plug flow reactor so as to maintain a residence time of the mixture in the reactor from about 0.5 to about 6 hours;
   recovering the thinned starch; and
   neutralizing the mixture.
7. A coated paper product comprising
   a paper sheet and
   a coating comprising
   conventional color coat and sizing components and
   dry thinned starch produced by a process comprising
     continuously feeding a mixture of a base starch and a hydrolyzing chemical selected from the group comprising hydrogen chloride gas, HCl and sulfuric acid to a plug flow reactor, said starch having a moisture content of between about 5% and about 17% by weight, said hydrolyzing chemical being injected into said starch in an amount ranging from about 0.04 to about 0.5% by weight dry solids basis;
   maintaining the mixture at a temperature of about 70° F. (21° C.) to about 170° F. (77° C.);
   adjusting the feed to said plug flow reactor so as to maintain a residence time of the mixture in the reactor from about 0.5 to about 6 hours;
   recovering the thinned starch; and
   neutralizing the mixture.
8. The paper product of claim 7 wherein said base starch is a waxy maize starch.
9. The paper product of claim 7 wherein said base starch is dent corn starch.
10. The paper product of claim 9 wherein said base starch is a chemically modified dent corn starch.
11. The paper product of claim 10 wherein said base starch is a hydroxyethylated dent corn starch.
12. A coated paper product comprising
    a paper sheet and
    a coating comprising
    conventional color coat and sizing components and
    dry thinned starch produced by a process comprising
      continuously feeding a mixture of an hydroxyethylated starch and a hydrolyzing chemical selected from the group comprising hydrogen chloride gas, HCl and sulfuric acid to a plug flow reactor, said starch having a moisture content of between about 5% and about 17% by weight, said HCl being injected into said starch in an amount ranging from about 0.04 to about 0.5% by weight dry solids basis;

maintaining the mixture at a temperature of about 70° F. (21° C.) to about 170° F. (77° C.);

adjusting the feed to said plug flow reactor so as to maintain a residence time of the mixture in the reactor from about 0.5 to about 6 hours;

recovering the thinned starch; and neutralizing the mixture.

13. A coated paper product comprising a paper sheet and a coating comprising conventional color coat and sizing components and dry thinned starch produced by a process comprising continuously feeding a mixture of a base starch and HCl to a plug flow reactor, said starch having a moisture content between about 5% and about 17% by weight, said HCl being injected into said starch in an amount ranging from about 0.04 to about 0.5% by weight dry solids basis;

maintaining the mixture at a temperature of about 70° F. (21° C.) to about 170° F. (77° C.);

adjusting the feed to said plug flow reactor so as to maintain a residence time of the mixture in the reactor from about 0.5 to about 6 hours;

recovering the thinned starch; and neutralizing the mixture.

14. The paper product of claim 13 wherein said base starch is a waxy maize starch.

15. The paper product of claim 13 wherein said base starch is dent corn starch.

16. The paper product of claim 15 wherein said base starch is a chemically modified dent corn starch.

17. The paper product of claim 16 wherein said base starch is a hydroxyethylated dent corn starch.

18. A coated paper product comprising a paper sheet and a coating comprising conventional color coat and sizing components and dry thinned starch produced by a process comprising continuously feeding a mixture of an hydroxyethylated starch and HCl to a plug flow reactor, said starch having a moisture content of between about 5% and about 17% by weight, said HCl being injected into said starch in an amount ranging from about 0.04 to about 0.5% by weight dry solids basis;

maintaining the mixture at a temperature of about 70° F. (21° C.) to about 170° F. (77° C.);

adjusting the feed to said plug flow reactor so as to maintain a residence time of the mixture in the reactor from about 0.5 to about 6 hours;

recovering the thinned starch; and neutralizing the mixture.

19. A paper product comprising a paper sheet and dry thinned starch produced by a process comprising continuously feeding a mixture of a base starch and a hydrolyzing chemical to a plug flow reactor, said starch having a moisture content between about 5% and about 17% by weight, said hydrolyzing chemical being injected into said starch in an amount ranging from about 0.04 to about 2.0% by weight dry solids basis;

maintaining said mixture at a temperature of about 70° F. (21° C.) to about 170° F. (77° C.);

adjusting the feed to said plug flow reactor so as to maintain a residence time of the mixture in the reactor from about 0.5 to about 6 hours;

recovering the thinned starch; and neutralizing the mixture.

20. The paper product of claim 19 wherein said base starch is a waxy maize starch.

21. The paper product of claim 19 wherein said base starch is dent corn starch.

22. The paper product of claim 21 wherein said base starch is a chemically modified dent corn starch.

23. The paper product of claim 22 wherein said base starch is a hydroxyethylated dent corn starch.

* * * * *